Sept. 24, 1957 A. SORENSON 2,807,691

SWITCH LEVER ASSEMBLIES

Filed Oct. 26, 1955

INVENTOR.
AAGE SORENSON
BY
Gerald P. Welch
ATTORNEY

United States Patent Office 2,807,691
Patented Sept. 24, 1957

2,807,691

SWITCH LEVER ASSEMBLIES

Aage Sorenson, Milwaukee, Wis.

Application October 26, 1955, Serial No. 542,799
2 Claims. (Cl. 200—172)

This invention relates to improvements in switch lever assemblies, and more particularly to a novel switch lever assembly utilized in an electric lamp.

An object of the invention is to provide a device of the type which may be utilized in combination with a conventional push button switch.

Another object of the invention is to provide a switch lever assembly which may be incorporated in the body and tail of an animal formed in the lamp body.

Other and further objects of the invention will appear as the description proceeds, reference being had to the accompanying drawing, in which.

Figures 1, 2:
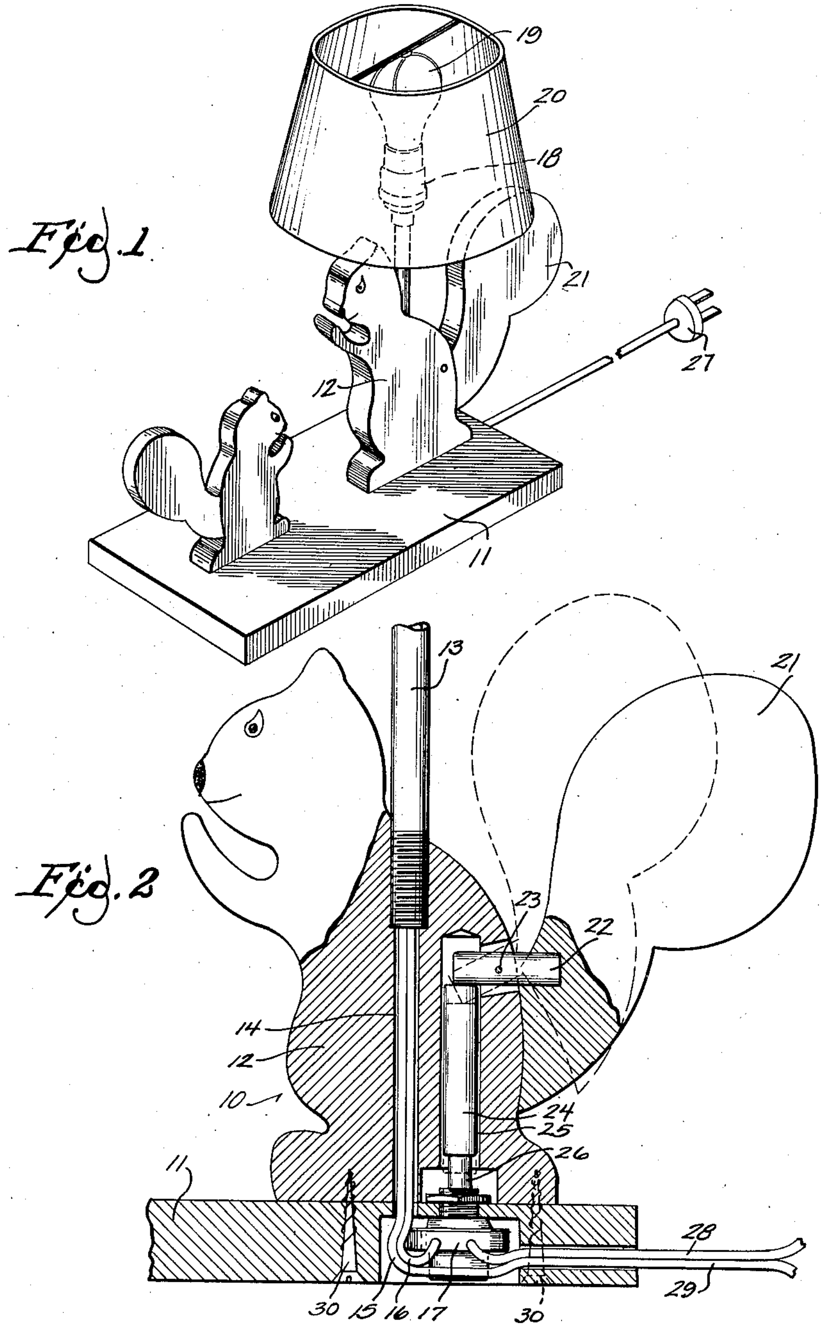
Fig. 1 is a perspective view from above of a lamp provided with a switch lever assembly embodied in the invention.
Fig. 2 is a side view partly in elevation and partly in section of the switch lever assembly.

Referring more particularly to the drawing, the numeral 10 refers to the device generally, including a base 11, the upright animal figure 12 fixed thereon, and the tubular element 13 protruding upwardly from the animal figure 12.

In the form of the invention illustrated in the drawing, the squirrel body 12 has a vertical bore at 14 to accommodate the tubular element 13 and the wires 15 and 16 to the push button switch 17 in the base 11. The tubular element 13 supports the socket 18 carrying the light bulb 19 and conventional shade 20.

The tail portion 21 is fixed on a dowel 22 which is pivotally mounted on a pin 23 in the body portion 12. A second dowel portion 24 floats in the vertical bore at 25 of the body portion 12, resting on the button 26 of the push button switch 17. A plug 27 on the wires 28 and 29 connects with a source of power.

The body portion 12 is fixed on the base by the threaded means 30.

In use, the light may be turned on or off, by merely pushing the top of the tail 21 toward the body 12. The dowel 22 will push downwardly against dowel 24 to actuate the push button switch 17.

It will be understood that the device is capable of many modifications in structure and design, without departing from the spirit of the invention, within the scope of the appended claims.

Having thus described the invention, what is claimed and desired to be secured by Letters Patent of the United States is:

1. In a lamp, a base plate, a push button switch on said base, a body element on said base having a vertical bore over said switch, an elongated element resting freely on said push button switch within said bore, a handle element fixed on a horizontally disposed dowel centrally pivoted on a horizontal axis within the body element, the free end of said pivoted dowel being adapted to press downwardly on the free dowel to actuate the switch when the tail element is manually moved toward the body element.

2. In a lamp, a base plate, a push button switch on said base, a body element on said base having a vertical bore over said switch, an elongated cylindrical element resting freely on said push button switch within said bore, a handle element fixed on a horizontally disposed dowel centrally pivoted on a horizontal axis within the body element, the free end of said pivoted dowel being adapted to press downwardly on the free cylindrical element to actuate the switch when the handle element is manipulated.

References Cited in the file of this patent

UNITED STATES PATENTS

| | | |
|---|---|---|
| 2,638,530 | Duda | May 12, 1953 |
| 2,692,973 | Asaff | Oct. 26, 1954 |